Patented Oct. 3, 1950

2,524,049

UNITED STATES PATENT OFFICE 2,524,049

PRODUCTION OF BIURET

Paul W. Garbo, Freeport, N. Y.

No Drawing. Application March 25, 1947,
Serial No. 737,101

16 Claims. (Cl. 260—553)

This application is a continuation-in-part of the copending application, Serial No. 470,817, filed December 31, 1942, which has eventuated in U. S. Patent 2,419,831.

This invention relates to the production of biuret from urea, the reaction being carried out in the presence of a catalyst.

Several processes have been proposed for the conversion of urea to biuret but none has been found which is completely satisfactory, particularly from a commercial viewpoint. One of the more recent proposals suggests that urea be partially converted to biuret by heating urea at subatmospheric pressure. Another proposal involves heating urea together with an inert solvent like toluene which is made to act like a reflux medium during the heating. Prior processes have been characterized by low yields and long reaction periods.

An important object of my invention is to provide a process for converting urea to biuret wherein the reaction is accelerated.

Another object is to provide a process for converting urea to biuret in increased yield.

These and additional objects of my invention will be apparent from the description which follows.

I have discovered that the production of biuret by heating molten urea is benefited by the introduction into the molten reaction mass of one or more substances which apparently function as catalysts. Suitable catalysts are substances containing elements of groups V and VI of the Mendelieff periodic system and having an atomic number between 15 and 92, inclusive. Representative catalysts are ammonium vanadate, bismuth sulfate, arsenious oxide, tungstic acid and sodium molybdate. Two or more catalysts may be used or the catalyst may be a compound of two or more active elements, e. g., selenium molybdate, ammonium phosphomolybdate and chromic ammonium sulfate. Catalysts containing the element phosphorus, particularly as a phosphate, or molybdenum, particularly as a molybdate, are preferred. Another group of suitable catalysts are substances containing the element boron, such as borax and sodium perborate; advantageously, boron catalysts are used in conjunction with one or more of the aforementioned catalysts either as separate compounds or as a joint compound, e. g., ammonium borotungstate. When the boron catalyst is used as a separate compound, boric acid is preferred. A particularly effective combination of catalysts is boric acid and a molybdate or a phosphate.

While the conversion of urea to biuret commences with the melting of the urea, i. e., at a temperature of about 130° C., higher temperatures are advisable. The reaction temperature is generally maintained within the range of about 140° to 200° C., and preferably in the range of about 145° to 180° C. The reaction mass including at least one catalyst is maintained in the heated fluid state until periodic analyses of the mass indicate that the reaction has reached a satisfactory stage of completion. When the reaction is terminated, biuret is recovered from the reaction mass by known procedures.

The several catalysts vary in their activity in promoting the conversion of urea to biuret but in general the amount of catalyst used will be in the range of about 0.1% to about 5.0% of the weight of the entire reaction mass. Since the catalysts accelerate the conversion of urea to biuret, a marked decrease in the reaction time is observed. For instance, if urea alone is heated for 1 hour at a temperature of 165° to 170° C., the yield of biuret is only about 9% of that theoretically obtainable. When urea and ammonium molybdate (0.3 part per 100 parts urea) are heated to the same temperature for only ½ hour, the yield of biuret is about 12% of the theoretical. As indicated by the foregoing example, a shorter reaction time is often accompanied by a higher yield of biuret. With a catalyst and at a temperature approaching 200° C., the reaction time will be of the order of ¼ hour. For any set of reaction conditions, the use of a catalyst will frequently decrease the reaction time to one half or less. Also, increases ranging up to 50% in the yields of biuret will often be noted in reactions conducted with the aid of catalysts.

In some instances, in converting urea to biuret it may be helpful to add a fluidizing medium (a high boiling-point liquid) such as naphthalene, kerosene, quinoline, nitrobenzene or chloronaphthalene.

Advantageously, the process of my invention is carried out at a reduced pressure, say 100 mm. of mercury or even less.

To illustrate the invention further, the following specific examples are given.

Example 1

A mixture of 100 parts by weight of urea and 0.4 part of disodium phosphate is maintained at a temperature of 155° C. and a pressure of about 50 mm. of mercury for 80 minutes. The molten reaction mass is thereupon poured into water and biuret recovered therefrom by the wellknown procedure involving filtration, crystallization, washing and drying. The yield of biuret amounts to 48% of the theoretical.

When this example is repeated without the phosphate catalyst, a biuret yield of only about 15% of the theoretical is realized.

*Example 2*

A mixture of 100 parts by weight of urea, 0.3 part of ammonium molybdate and 0.2 part of boric acid is maintained at a temperature of 170° C. and at atmospheric pressure for 50 minutes. The recovered biuret corresponds to 27% of the theoretical yield.

On repeating this example without the molybdate and boric acid catalysts, the biuret yield is about 8% of that theoretically obtainable.

Obviously, many modifications of the basic process of my invention will suggest themselves to those skilled in the art. Thus, because my catalysts accelerate the conversion of urea to biuret, it now becomes feasible to operate on a continuous basis. For instance, molten urea containing a catalyst of this invention is pumped through a heated tubular coil maintained at the desired reaction temperature; the time of travel of the molten material through the heated coil is adjusted so that the molten material discharges with a satisfactory content of biuret.

The foregoing description and examples are intended to be illustrative only. Variations of my invention conforming to its spirit are to be considered within the scope of the claims.

What I claim is:

1. The process for producing biuret which comprises heating a mass of urea substantially free of reactive substances at a temperature in the range of about 130° to about 200° C. to effect the condensation of pairs of urea molecules into biuret molecules, effecting said condensation of urea into biuret in the presence of a small quantity of an inorganic oxygen-containing compound containing an element selected from groups V and VI of the Mendelieff periodic system and having an atomic number between 15 and 92, inclusive, as catalyst, said small quantity of catalyst being not more than about 5% of the weight of said mass of urea, and recovering the thus produced biuret from the resulting reaction mass.

2. The process for producing biuret which comprises heating a mass of urea substantially free of reactive substances at a temperature in the range of about 130° to about 200° C. to effect the condensation of pairs of urea molecules into biuret molecules, effecting said condensation of urea into biuret in the presence of a small quantity of an inorganic, oxygen-containing compound of molybdenum as catalyst, said small quantity of catalyst being not more than about 5% of the weight of said mass of urea, and recovering the thus produced biuret from the resulting reaction mass.

3. The process for producing biuret which comprises heating a mass of urea substantially free of reactive substances at a temperature in the range of about 130° to about 200° C. to effect the condensation of pairs of urea molecules into biuret molecules, effecting said condensation of urea into biuret in the presence of a small quantity of an inorganic, oxygen-containing compound of phosphorus as catalyst, said small quantity of catalyst being not more than about 5% of the weight of said mass of urea, and recovering the thus produced biuret from the resulting reaction mass.

4. The process for producing biuret which comprises heating a mass of urea substantially free of reactive substances at a temperature in the range of about 130° to about 200° C. to effect the condensation of pairs of urea molecules into biuret molecules, effecting said condensation of urea into biuret in the presence of a small quantity of inorganic, oxygen-containing compounds of molybdenum and boron as catalyst, said small quantity of catalyst being not more than about 5% of the weight of said mass of urea, and recovering the thus produced biuret from the resulting reaction mass.

5. The process for producing biuret which comprises heating a mass of urea substantially free of reactive substances at a temperature in the range of about 130° to about 200° C. to effect the condensation of pairs of urea molecules into biuret molecules, effecting said condensation of urea into biuret in the presence of a small quantity of ammonium molybdate and boric acid as catalyst, said small quantity of catalyst being not more than about 5% of the weight of said mass of urea, and recovering the thus produced biuret from the resulting reaction mass.

6. The process for producing biuret which comprises heating a mass of urea substantially free of reactive substances at a temperature in the range of about 130° to about 200° C. to effect the condensation of pairs of urea molecules into biuret molecules, effecting said condensation of urea into biuret in the presence of a small quantity of an inorganic, oxygen-containing compound of boron as catalyst, said small quantity of catalyst being not more than about 5% of the weight of said mass of urea, and recovering the thus produced biuret from the resulting reaction mass.

7. The process for producing biuret which comprises heating a mass of urea substantially free of reactive substances at a temperature in the range of about 145° to about 180° C. to effect the condensation of pairs of urea molecules into biuret molecules, effecting said condensation of urea into biuret in the presence of a small quantity of an inorganic, oxygen-containing compound containing an element selected from groups V and VI of the Mendelieff periodic system and having an atomic number between 15 and 92, inclusive, as catalyst, said small quantity of catalyst being not more than about 5% of the weight of said mass of urea, and recovering the thus produced biuret from the resulting reaction mass.

8. The process for producing biuret which comprises heating a mass of urea substantially free of reactive substances at a temperature in the range of about 145° to about 180° C. to effect the condensation of pairs of urea molecules into biuret molecules, effecting said condensation of urea into biuret in the presence of a small quantity of an inorganic, oxygen-containing compound of molybdenum as catalyst, said small quantity of catalyst being not more than about 5% of the weight of said mass of urea, and recovering the thus produced biuret from the resulting reaction mass.

9. The process of claim 8 wherein said condensation of urea into biuret is effected at a reduced pressure of not more than 100 mm. of mercury.

10. The process for producing biuret which comprises heating a mass of urea substantially free of reactive substances at a temperature in the range of about 145° to about 180° C. to effect the condensation of pairs of urea molecules into biuret molecules, effecting said condensation of urea into biuret in the presence of a small quantity of an inorganic, oxygen-containing compound of boron as catalyst, said small quantity of catalyst being not more than about 5% of the weight of said mass of urea, and recovering the thus produced biuret from the resulting reaction mass.

11. The process for producing biuret which comprises heating a mass of urea substantially free of reactive substances at a temperature in the range of about 145° to about 180° C. to effect the condensation of pairs of urea molecules into biuret molecules, effecting said condensation of urea into biuret in the presence of a small quantity of an inorganic molybdate as catalyst, said small quantity of catalyst being not more than about 5% of the weight of said mass of urea, and recovering the thus produced biuret from the resulting reaction mass.

12. The process for producing biuret which comprises heating a mass of urea substantially free of reactive substances at a temperature in the range of about 145° to about 180° C. to effect the condensation of pairs of urea molecules into biuret molecules, effecting said condensation of urea into biuret in the presence of a small quantity of an inorganic phosphate as catalyst, said small quantity of catalyst being not more than about 5% of the weight of said mass of urea, and recovering the thus produced biuret from the resulting reaction mass.

13. The continuous process for producing biuret which comprises preparing an admixture of molten urea and an inorganic, oxygen-containing compound of molybdenum as catalyst effective in the condensation of pairs of urea molecules into biuret molecules, said admixture being substantially free of reactive substances and containing not more than about 5% by weight of said catalyst, passing said admixture through a heated path at a temperature in the range of about 140° to about 200° C. to effect said condensation of urea into biuret, and recovering the thus produced biuret from the reaction mass issuing from said heated path.

14. The continuous process for producing biuret which comprises preparing an admixture of molten urea and an inorganic molybdate as catalyst effective in the condensation of pairs of urea molecules into biuret molecules, said admixture being substantially free of reactive substances and containing not more than about 5% by weight of said catalyst, passing said admixture through a heated path at a temperature in the range of about 140° to about 200° C. to effect said condensation of urea into biuret, and recovering the thus produced biuret from the reaction mass issuing from said heated path.

15. The continuous process for producing biuret which comprises preparing an admixture of molten urea and an inorganic, oxygen-containing compound of phosphorus as catalyst effective in the condensation of pairs of urea molecules into biuret molecules, said admixture being substantially free of reactive substances and containing not more than about 5% by weight of said catalyst, passing said admixture through a heated path at a temperature in the range of about 140° to about 200° C. to effect said condensation of urea into biuret, and recovering the thus produced biuret from the reaction mass issuing from said heated path.

16. The continuous process for producing biuret which comprises preparing an admixture of molten urea and an inorganic phosphate as catalyst effective in the condensation of pairs of urea molecules into biuret molecules, said admixture being substantially free of reactive substances and containing not more than about 5% by weight of said catalyst, passing said admixture through a heated path at a temperature in the range of about 140° to about 200° C. to effect said condensation of urea into biuret, and recovering the thus produced biuret from the reaction mass issuing from said heated path.

PAUL W. GARBO.

REFERENCES CITED

The following references are of record in the file of this patent:

UNITED STATES PATENTS

| Number | Name | Date |
|---|---|---|
| 2,089,697 | Groebe | Aug. 10, 1937 |
| 2,145,392 | Harmon | Jan. 31, 1939 |
| 2,281,599 | Morgan | May 5, 1942 |
| 2,338,987 | Watzel | Jan. 11, 1944 |
| 2,350,850 | Watzel | June 6, 1944 |
| 2,370,065 | Olin | Feb. 20, 1945 |
| 2,419,831 | Garbo | Apr. 29, 1947 |

OTHER REFERENCES

Weith, "Ber. deut. Chem., vol. 10 (1877) page 1743.

Warren, "Ber. deut. Chem., vol. 68 (1935) page 959.

Jerzmanowski-Sienkiewiczova, vol. 30 (1936) page 2933, Chem. Abs.

Werner et al, "Chemical Abstracts", vol. 37 (Oct. 20, 1943) p. 5941.